United States Patent [19]
Szeverenyi et al.

[11] 3,878,538
[45] Apr. 15, 1975

[54] POSITION SENSOR WITH THERMAL TIME DELAY

[75] Inventors: Nikolaus A. Szeverenyi; David F. Thompson, both of Warren, Pa.

[73] Assignee: GTE Sylvania Incorporated, Stamford, Conn.

[22] Filed: Apr. 3, 1974

[21] Appl. No.: 457,441

[52] U.S. Cl. ............... 340/282; 337/1; 340/52 D
[51] Int. Cl. ............................................. G08b 21/00
[58] Field of Search ...... 340/282, 256, 52 D; 337/1, 337/3, 79; 307/119

[56] References Cited
UNITED STATES PATENTS

| | | | |
|---|---|---|---|
| 2,718,630 | 9/1955 | Wait | 340/282 |
| 3,474,372 | 10/1969 | Davenport et al. | 337/1 |
| 3,789,338 | 1/1974 | Szeverenyi et al. | 337/3 |

*Primary Examiner*—Glen R. Swann, III
*Attorney, Agent, or Firm*—Donald R. Castle; Norman J. O'Malley; Lawrence R. Fraley

[57] ABSTRACT

A sensor device for providing a time-delayed indication upon the motion of a movable member. Comprises a housing member, a terminal means for being engaged by said movable member, a heater means for providing heat only when the terminal means and movable member are engaged, and a heat-responsive means for responding to the heat from said heater means for a predetermined time period. A sensing apparatus is also provided which includes the described device and an electrical circuit.

15 Claims, 6 Drawing Figures

POSITION SENSOR WITH THERMAL TIME DELAY

BACKGROUND OF THE INVENTION

This invention relates to motion sensor devices and more particularly to a sensor device able to provide a time-delayed indication upon the motion of a movable member.

There has long existed a need for sensor devices of the nature described above. For example, a particular application for such a device could be in providing an indication of excessive use of one's brakes in a motor vehicle. Should the vehicle operator depress the braking pedal for a prolonged period, undue wear results on the braking system. In the case of air brakes, excessive use results in a depletion of air reserve, thus presenting a hazardous situation as well.

Previously known sensor devices capable of providing the described indication have usually required extensive electronic circuitry which resulted in devices complex in operation as well as relatively expensive by manufacturing standards.

U.S. Pat. No. 3,789,338 discloses and claims a sensing apparatus and device and is assigned to the same assignee as the present invention. The described previous device and apparatus is responsive to pressure and employs a continuously operated heater means which operates in conjunction with a pair of opposed heat responsive means. A pressure activated tip member when activated provides a thermal imbalance to the apparatus and device.

The present invention on the other hand is responsive to the motion of a movable member and comprises an intermittently operated heater means which in the preferred embodiment serves to heat only one heat responsive means.

It is believed, therefore, that a sensor device which is capable of providing a time delayed indication upon the movement of a movable member and is relatively simple in operation and inexpensive to manufacture would constitute an advancement in the art.

OBJECTS AND SUMMARY OF THE INVENTION

It is, therefore, a primary object of this invention to provide a sensor device capable of providing a time-delayed indication upon the motion of a movable member.

It is a further object of this invention to provide a sensor device of the nature described which is relatively simple in operation and inexpensive to manufacture.

In accordance with one aspect of this invention, there is provided a sensor device for providing a time-delayed indication upon the motion of a movable member. This sensor device comprises a housing member, a terminal means positioned relative to a chamber of said housing and adapted for being engaged by the movable member, a heater means within the housing's chamber and operatively connected to the described terminal means, said heater means adapted for providing heat when the terminal means and movable member are engaged, and a heat responsive means which receives heat from the heater means and responds to said heat for a predetermined time period.

In accordance with another aspect of this invention, there is provided a sensing apparatus which includes the above-described sensor device and a means for sensing the termination of the predetermined time period of response of the device's heat responsive means. This sensing means in the preferred embodiment comprises an electrical circuit which includes a source of electrical potentials and a current indicating means.

DETAILED DESCRIPTION OF THE PREFERRED EMBOIDMENTS

For a better understanding of the present invention, together with other and further objects, advantages and capabilities thereof, reference is made to the following disclosure and appended claims in connection with the above description of some of the aspects of the invention.

Figure 1:
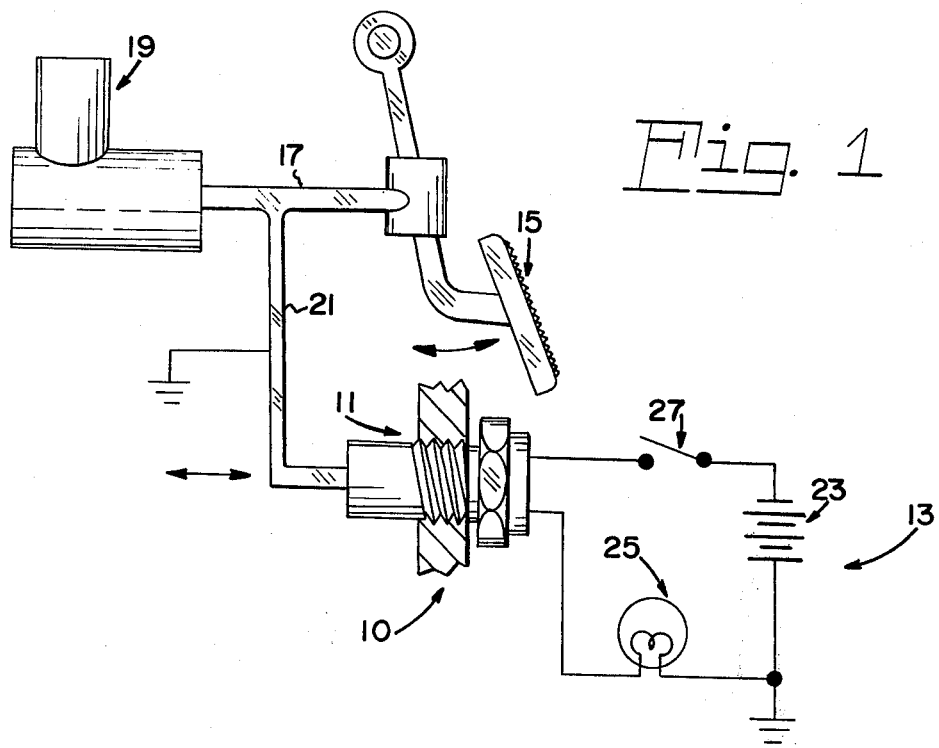
FIG. 1 is a side-elevational view of one embodiment of the present invention.

With particular reference to FIG. 1, there is illustrated the sensing apparatus 10 in accordance with a preferred embodiment of the present invention. Apparatus 10 comprises a sensor device 11 and a sensing means 13. As shown, a particular application for sensing apparatus 10 is to sense the movement of the braking pedal 15 of an automobile's braking system. This system is illustratively represented as comprising the described pedal 15, an interconnecting arm 17, and the vehicle's master cylinder 19. It is understood that these described components are only illustrative of a braking system and are not meant to restrict the application of the present invention in any manner.

Sensing apparatus 10 is positioned in such a manner so as to sense the movement of an adjoining arm 21 of the interconnecting arm 17 of the braking system. Accordingly, the primary purpose of sensing apparatus 11 is to indicate when arm 21 has been movably displaced for a predetermined time period. Such displacement, as can be appreciated, is the result of depression of brake pedal 15.

Sensing means 13 in the preferred embodiment comprises a source of electrical potential 23 and a current indicating means 25. A switching means 27 is also included, although not considered an essential component of apparatus 10. Sensing means 13 is preferably connected to ground potential as is adjoining arm 21 of the braking system.

Figure 2:
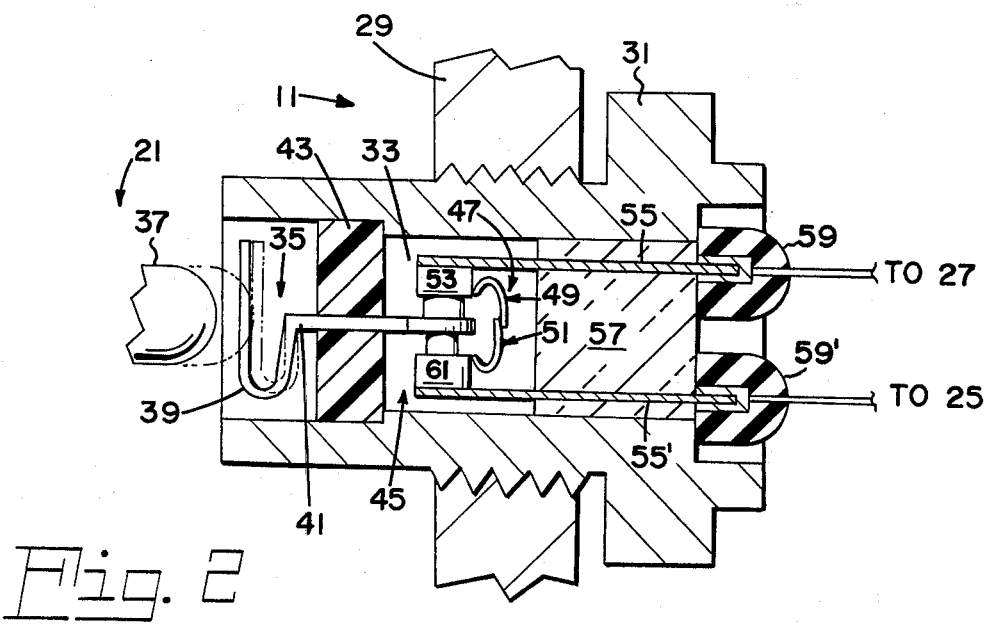
FIG. 2 is an enlarged view of a sensor device of FIG. 1.

With particular reference to FIG. 2, a more detailed view of the sensor device as illustrated in FIG. 1 is provided. Sensor device 11, positioned within a housing wall 29 or similar member, comprises a housing member 31. Housing 31 defines a chamber 33 therein. Positioned relative to chamber 33 is a terminal means 35, which is adapted for being engaged by a protruding portion 37 of adjoining arm 21. Terminal means 35 in the preferred embodiment comprises an electrically conductive spring member which has a resilient portion 39 positioned externally of chamber 33 and an elongated portion 41 which extends through an insulative member 43 into chamber 33. Insulative member 43 in the preferred embodiment comprises a stationary disc member preferably of plastic or similar material.

Heater means 45 is positioned within chamber 33 and is operatively connected to terminal 35. As will be explained, heater means 45 provides heat only when the resilient portion 39 of terminal means 35 is engaged by the protruding portion 37 of adjoining arm 21. A more detailed description of the operation of heater means 45 will be given with the description of FIG. 3. Positioned relative to heater means 45 is a heat-responsive means 47 which is adapted for receiving heat from the heater means. In the preferred embodiment, heat responsive means 47 comprises a pair of opposingly positioned bi-metallic members 49 and 51. It is to be understood, however, that only one heat responsive member need be utilized in the present invention. For example, bi-metallic member 51 could be removed and an alternate embodiment of a contact replaced therefor. It is only essential to the operation of the present invention that a single heat responsive means positioned relative to the heater means and adapted for receiving heat therefrom be utilized.

A first end 53 of heater means 45 is secured to a lead 55 which in turn is positioned within an insulative material such as glass 57. As shown, lead 55 has a first plug 59 affixed thereto and thus provides a means for electrically connecting lead 55 to switch 27. In similar fashion, a second portion 61 of heater means 45 has a second connecting lead 55' affixed thereto. Lead 55' has plug 59' secured thereto in similar fashion to plug 59 on lead 55, and thus provides a means for electrically connecting lead 55' to current indicating means 25.

Figure 3:
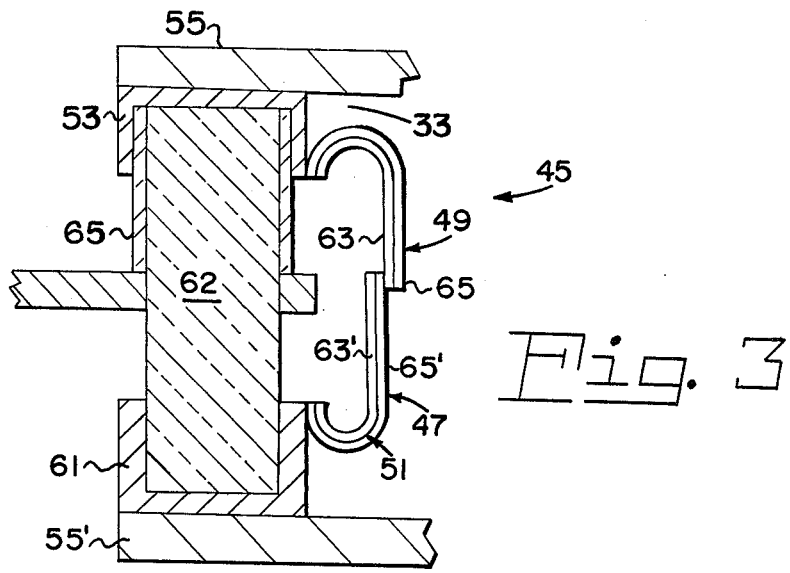
FIG. 3 is an enlarged view of the heater means in accordance with a preferred embodiment of the invention.

With particular reference to FIG. 3, there is illustrated an enlarged view of heater means 45 in accordance with a preferred embodiment of the present invention. Heater means 45 preferably comprises a central body portion 62 of electrically insulative material such as glass. Positioned about an upper portion of body 62 is a quantity of electrically resistive material 65 as is typically found in most resistors in today's electronic art. First portion 53 of heater means 45 is preferably of a good electrically conductive material such as stainless steel and is electrically joined to resistive material 65. As indicated in FIG. 3, bi-metallic member 49 is secured to first portion 53 and thus positioned relative to resistive material 65. In this manner, bi-metallic member 49 is able to receive heat from material 65 when electrical current passes therethrough. Electrically connected at the end of resistive material 65 opposing first portion 53 is elongated portion 41 of the terminal means 35.

Secured to second end portion 61 is the second bi-metallic member 51. As previously stated, second bi-metallic member 51 is incorporated within the preferred embodiment of a sensor device of the present invention but does not constitute an essential component to the operation of the device. The incorporation of second bi-metallic member 51 is to provide the sensor device with the ability to be ambient compensated, that is, the sensor device is able to operate under conditions in which the temperature of chamber 33 may vary. Should this added desired feature not be required, however, it is easily seen that bi-metallic member 49 could easily be adapted for engaging second portion 61 rather than the described bi-metallic member 51.

Both bi-metallic members 49 and 51 are positioned in a normally closed contacting manner, that is to say, when the adjoining arm 21 is not engaging terminal means 35, or when switch 27 is open, both heat responsive members should be in contact.

To adequately achieve the degree of deflection required in the operation of sensor 11 and when using both bi-metallic members 49 and 51, both members should be of materials having substantially similar characteristics. In the preferred embodiment of the present invention, similar bi-metals are used for each of the members 49 and 51. More specifically, a bi-metal utilized successfully in sensor 11 is Chace 2400 bi-metal, manufactured by the W. M. Chace Co. of Detroit, Mich., a subsidiary of the W. B. Driver Co. of Newark, N. J., a subsidiary of the assignee of the present invention. Chace 2400 bi-metal has a high expanding side (illustrated as high expanding layers 63 and 63') consisting essentially of about 22 percent by weight nickel, 3 percent by weight chromium, with the remainder iron, and a low expanding side (illustrated as low expanding layers 65 and 65') consisting essentially of 36 to 42 percent nickel with remainder iron. Although the described material is preferred for both bi-metallic members 49 and 51, it is understood that practically any bi-metallic compositions could be utilized with the present invention, and, therefore, the described material is not meant to be restrictive to the invention.

Figure 4A:
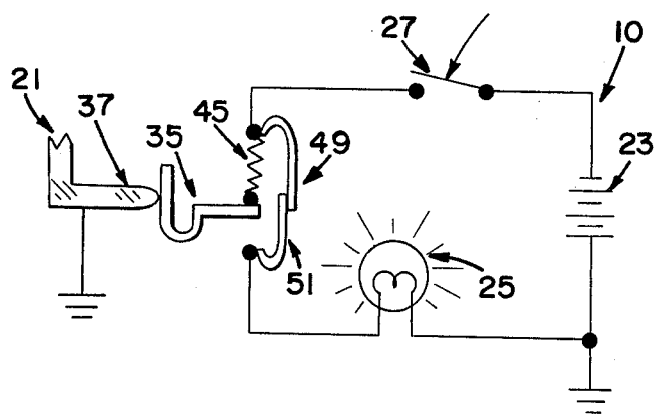
FIGS. 4A–4C are schematic views of the operation of the sensing apparatus of the invention.
Figure 4B:
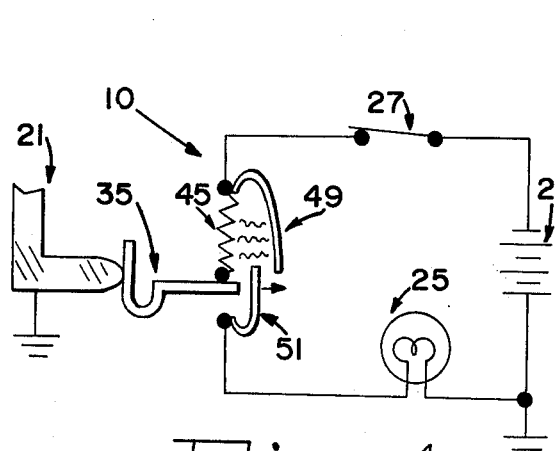
Figure 4C:
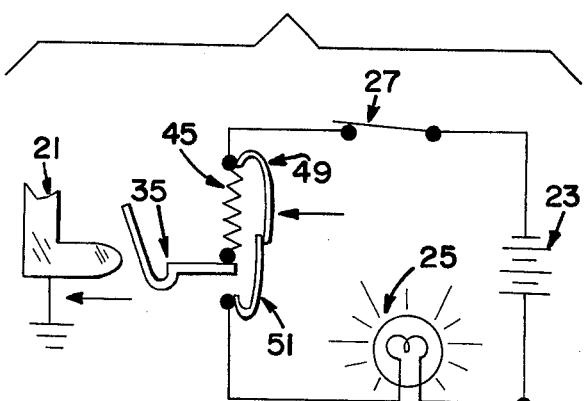

With reference to FIGS. 4A–4C, the operation of sensing apparatus 10 is given. In FIG. 4A, switch 27 has been closed resulting in a flow of electrical current from potential source 23 through heater means 45, terminal means 35, and protruding portion 37 where it is electrically connected to ground. Electrical current also flows through the normally engaged bi-metallic members 49 and 51 and is thus at sufficient strength to activate the current indicating means 25. It is to be understood that by varying the components in the apparatus, it would be possible to prohibit indicating means 25 from being actuated at this time. Such a modification might include utilizing an indicating means having relatively high resistance during cold operation and a heater means utilizing a relatively low resistance resistive material. However, as will be explained, the activation of current indicating means 25 is only a temporary occurrance with the indicating means being shortly extinguished.

In FIG. 4B, electrical current is passed through the resistive material 65 for a period of time sufficient to enable this material to become heated. The generation of heat within the material 65 is a typical characteristic of resistive materials known in the electrical field. As illustrated in FIG. 4B, the heat generated by the material 65 of heater means 45 causes the first heat responsive member 49 to be displaced in such a manner so as to become disengaged from the second heat responsive member 51. This is achieved simply because the first heat responsive member is positioned adjacent the supply of heat from heat resistive material 65 whereas the second heat responsive means 51 is not. Once the described disengagement has been accomplished, electrical current only passes through the heater means 45 and terminal means 35 and on to ground. Should it be desired to electrically join the adjoining arm 21 to the current indicating means 25 in a common circuit, this also could be achieved. However, indicating means 25 would still not be activated under the conditions illustrated in FIG. 4B as the current flowing in this circuit, having gone through resistive material 65, would not be sufficient to activate means 25.

Should the operator of the motor vehicle depress braking pedal 15 causing adjoining arm 21 to become disengaged from terminal member 35, the described electrical circuit is broken. Accordingly, the passage of electrical current through heater means 45 is terminated. As illustrated in FIG. 4C, this termination of current permits heater means 45 to become cooled. Accordingly, the first heat responsive means 49 will substantially return to its original position after a predetermined time period. Upon doing so, both heat responsive members 49 and 51 will again become engaged and a path for electrical current to indicating means 25 is once again established. This path, absent the described resistive heater means 45, provides a means whereby elevated electrical current will now pass and actuate means 25. The period of time required for first heat responsive means 49 to return to its original position and thus engage second heat responsive means 51 thus provides a time-delayed indication of the motion of movable adjoining arm 21. Thus, the operator of the motor vehicle has been provided with an indication that the braking pedal has been depressed for said predetermined time period.

When utilizing the bi-metallic materials specified and including a 12 volt potential source 23, a resistive material having a resistance within the range of from 200 to 400 ohms, and a current indicating means having a cold resistance of 0.5 ohms and a hot resistance of 20 ohms, it is possible to provide a time period of within the range of from about 1 to about 60 seconds. Such a range is possible by utilizing the described components as well as minor variations to the quantities of materials used for the heat responsive means 47.

Thus, there has been provided a sensing apparatus and device for providing a time-delayed indication of the motion of a movable member. Unique features of this apparatus, which include temperature compensation means, have also been provided.

While there have been shown and described what are at present considered the preferred embodiments of the invention, it will be obvious to those skilled in the art that various changes and modifications may be made therein without departing from the scope of the invention as defined by the appended claims.

what is claimed is:

1. A sensor device for providing a time-delayed indication upon the motion of a movable member, said sensor device comprising:
   a housing member defining a chamber;
   terminal means positioned relative to said chamber and adapted for being engaged by a movable member;
   heater means within said chamber and operatively connected to said terminal means, said heater means adapted for providing heat only when said terminal means and said movable member are engaged; and
   heat responsive means positioned relative to said heater means for receiving heat therefrom, said heat responsive means adapted for responding to said heat for a predetermined time period after said heater means ceases providing heat.

2. The sensor device according to claim 1 wherein said predetermined time period is within the range of from about 1 to about 60 seconds.

3. The sensor device according to claim 1 wherein said terminal means comprises an electrically conductive spring member.

4. The sensor device according to claim 1 wherein said heater means within said chamber comprises an electrical resistive element.

5. The sensor device according to claim 1 wherein said heat responsive means for receiving heat from said heater means comprises a bimetallic member.

6. The sensor device according to claim 1 further including a second heat responsive means which operates in conjunction with said first heat responsive means to provide a means whereby said sensor device is ambient compensated.

7. The sensor device according to claim 6 wherein each of said first and second heat responsive means comprises a bimetallic member.

8. A sensing apparatus for providing a time-delayed indication upon the motion of a movable member, said sensing apparatus comprising:
   a sensor device including a housing member defining a chamber, terminal means positioned relative to said chamber and adapted for being engaged by a movable chamber, heater means within said chamber and operatively connected to said terminal means, said heater means adapted for providing heat only when said terminal means and said movable member are engaged, heat responsive means positioned relative to said heater means for receiving heat therefrom, said heat responsive means adapted for responding to said heat for a predetermined time period after said heater means ceases providing heat; and
   means for sensing the termination of said time period of response of said heat responsive means.

9. The sensing apparatus according to claim 8 wherein said predetermined time period is within the range of from about 1 to about 60 seconds.

10. The sensing apparatus according to claim 8 wherein said means for sensing the termination of said time period comprises an electrical circuit including a source of electrical potential operatively connected to said heater means and said heat responsive means, and a current indicating means, said heat responsive means adapted for opening and closing said circuit, said current indicating means adapted for indicating electrical current in said circuit when said heat responsive means closes said circuit.

11. The sensing apparatus according to claim 8 wherein said heat responsive means comprises a bimetallic member.

12. The sensing apparatus according to claim 10 wherein said heater means is an electrical resistive element.

13. The sensing apparatus according to claim 12 wherein said terminal means comprises an electrically conductive spring member operatively connected to said electrical resistive element.

14. The sensing apparatus according to claim 10 further including a second heat responsive means which operates in conjunction with said first heat responsive means during engagement of said terminal means and said movable member to provide a means whereby said sensing apparatus is ambient compensated, said second heat responsive means operatively connected to said current indicating means.

15. The sensing apparatus according to claim 14 wherein each of said heat responsive means comprises a bimetallic member.

* * * * *

UNITED STATES PATENT OFFICE
CERTIFICATE OF CORRECTION

PATENT NO. : 3,878,538
DATED : April 15, 1975
INVENTOR(S) : Nikolaus A. Szeverenyi and David F. Thompson It is certified that error appears in the above-identified patent and that said Letters Patent are hereby corrected as shown below:

Claim 8, line 7 - "movable chamber" should read -- movable member --

Claim 14, lines 60-61 - "during engagement of said terminal means and said movable member" should be deleted as per Examiner's Amendment of October 25, 1974.

Signed and sealed this 15th day of July 1975.

(SEAL)
Attest:

RUTH C. MASON
Attesting Officer

C. MARSHALL DANN
Commissioner of Patents
and Trademarks